Oct. 24, 1961          B. WALKER          3,005,657
MOUNTING FOR SPARE TIRE IN VEHICLE FENDER
Filed June 16, 1958          2 Sheets-Sheet 1
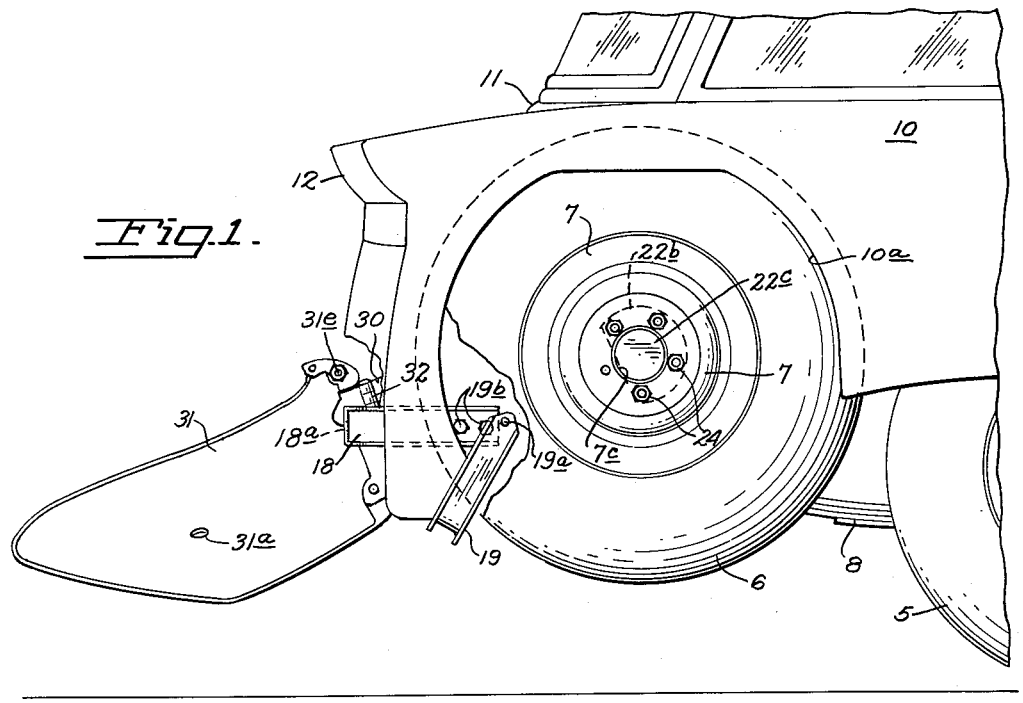
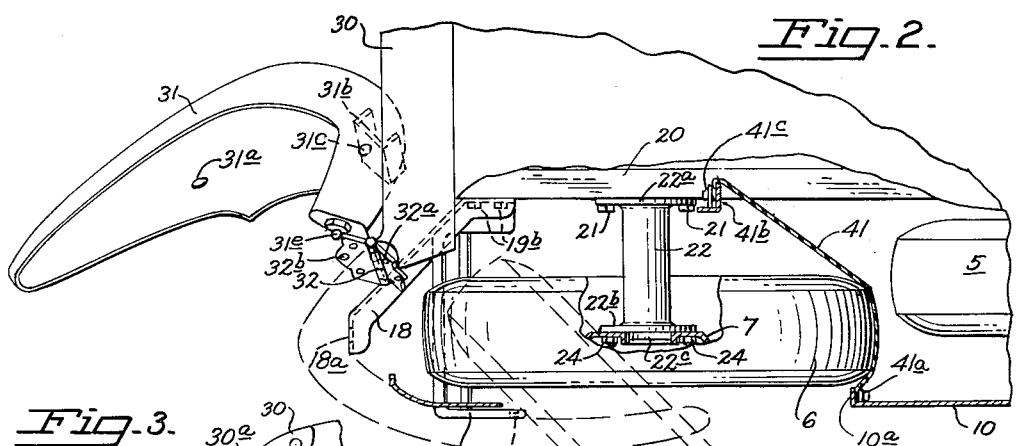
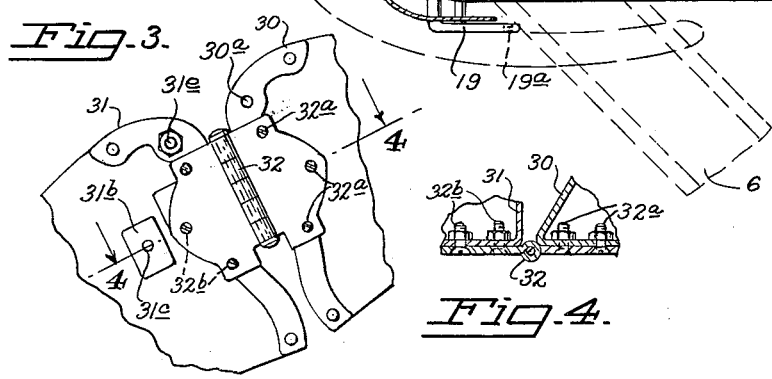
INVENTOR.

Oct. 24, 1961 B. WALKER 3,005,657
MOUNTING FOR SPARE TIRE IN VEHICLE FENDER
Filed June 16, 1958 2 Sheets-Sheet 2

INVENTOR.
Brooks Walker

United States Patent Office 3,005,657
Patented Oct. 24, 1961

3,005,657
MOUNTING FOR SPARE TIRE IN VEHICLE FENDER
Brooks Walker, 155 Montgomery St., San Francisco, Calif.
Filed June 16, 1958, Ser. No. 742,385
7 Claims. (Cl. 296—37.2)

This invention pertains to improvements in the location and mounting for a vehicle spare tire.

My U.S. Patent No. 2,823,068 shows the nesting of a spare tire in a rear fender or body recess in back of the rear wheel with the recess large enough, in side elevation, to receive the spare tire when moved substantially horizontally into said recess.

This invention teaches how a recess of smaller diameter than the outside diameter of the spare tire can be used to receive said spare tire.

Another feature is to have an improved appearance, as the opening more closely hugs the tire side than if the opening is the same diameter or larger than said spare maximum diameter.

Another feature is the use of a bumper that snugs around a substantial portion of the spare tire and is hinged or movable and released by means of a tire changing tool such as a wheel wrench to release said bumper to allow removal or installation of said spare tire in said recess.

Another feature is the provision of pins and holes in the bumper and support bracket that add to the rigidity of the hinged movable portion of the bumper when closed over the spare, without requiring the removal of screws or bolts other than the one to unlock the hinged or movable bumper section.

Another feature is the use of an elastic wall adjacent one portion of the spare tire enclosure to separate the spare tire from the rear wheel to keep mud and water thrown from said rear wheel onto the spare and its recess. This elastic wall also allows the spare to be inserted in place by stretching said elastic wall to minimize the space between the spare tire and the rear tire to allow the necessary clearance for tire chains on the rear wheels, etc.

Other features will be more particularly pointed out in the accompanying specification and claims.

I have illustrated by invention in the accompanying drawings in which:

FIG. 1 is a side view in elevation with a part cut away of a rear portion of a vehicle showing one form of my invention.

FIG. 2 is a plan view with a part cut away of a right rear corner of the vehicle shown in FIG. 1.

FIG. 3 is an enlarged broken view showing the hinge which supports the end section on the bumper illustrated in FIGS. 1 and 2.

FIG. 4 is a sectional view of the structure illustrated in FIG. 3 taken on the line 4—4 thereof.

In all figures like numerals of reference refer to corresponding parts.

Figure 5:
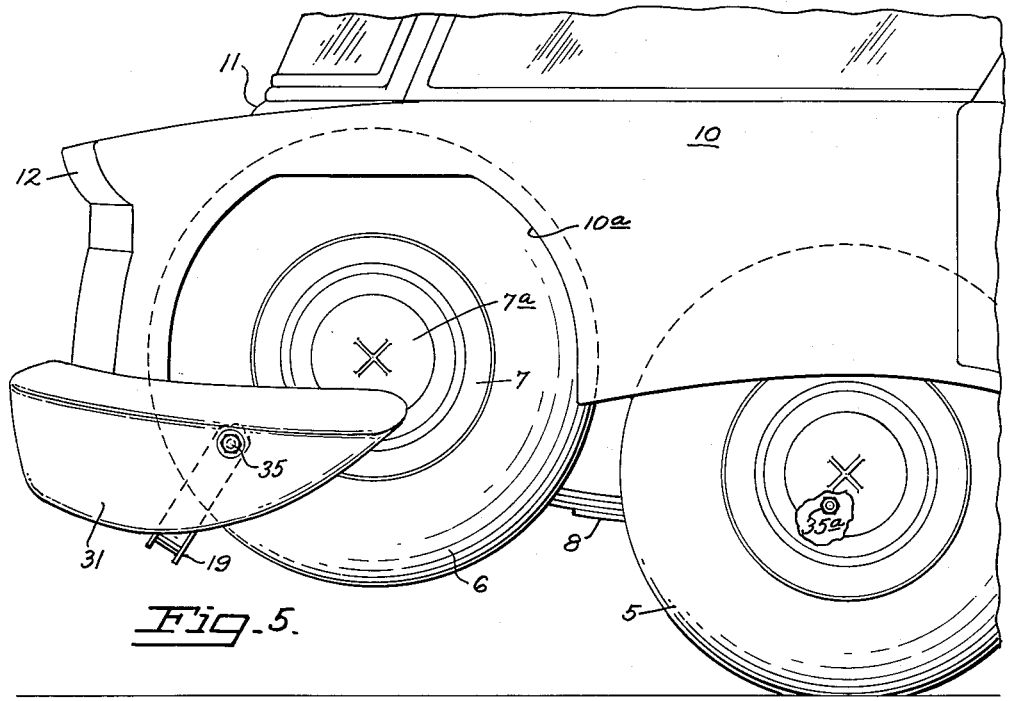
FIG. 5 is a view of the structure illustrated in FIG. 1 with the bumper section in driving position across part of the spare tire.

Referring to all figures I have shown a body 10 supported in part on rear wheel 5 by spring 8. A substantially vertical side wall portion of the fender or body back of the rear wheel is cut out as at 10a to a diameter smaller than the maximum diameter of the spare tire 6. The cut out 10a may have a flat top as shown if desired. Spare tire 6 is mounted on spare wheel rim 7.

Body 10 is mounted on frame 20 which supports bracket 22 by bolts 21 through flange 22a and into or through frame 20. Flange 22b has one or more threaded holes to receive wheel mounting bolts 24 through one or more wheel bolt mounting holes used to mount the wheels on the rear axle or front wheel hubs.

Flange 22b may be cut off at one portion as shown in FIG. 1 to allow easier installation of the spare past bracket 19 as shown in FIG. 2. Bracket 19 is secured to frame 20 by bolts 19b which also support bracket 18 which may be welded to bracket 19. Rear bumper center section 30 has hinge 32 bolted to its inturned flange by bolts 32a which are preferably flush on the side shown in FIG. 3. The other half of hinge 32 is secured by bolts 32b to movable bumper portion 31. Movable bumper portion 31 has a hole 31a adapted to receive a bolt 35 as shown in FIG. 5. Bolt 35 is preferably but not necessarily the same size as the wheel mounting bolts 24 or 35a and secures bumper portion 31 to support bracket 19.

Bracket 18 has hole 18a adapted to receive stud 31c mounted on bracket 31b which in turn is mounted on bumper portion 31 in such a position that when bolt 35 is tightened stud 31c is tightly inserted in hole or slot 18a to assist the bumper portion 31 to take shocks as when bumping a garage wall, pushing a car or other bumper pressures. Another stud 31e engages a hole 30a in bumper center section 30 to again add stiffeners to the hinge 32. Studs 31e and 31c require no attention or unscrewing to release bumper section 31 for spare tire removal or insertion. The removal of bolt 35 is all that is required to release bumper section 31 to clear spare tire 6. By inclining the large pin of hinge 32 the appearance of hinge 32 is more acceptable than if at a substantially different plane or angle than the rear portion of the bumper near where it is attached or the exterior portion nearest said hinge pin.

Figure 6:
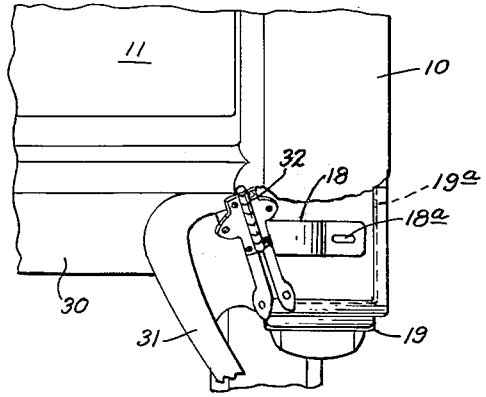
FIG. 6 is rear view, with parts broken away, of the structure illustrated in FIGS. 1 and 2 with the bumper section in open position.
Figure 8:
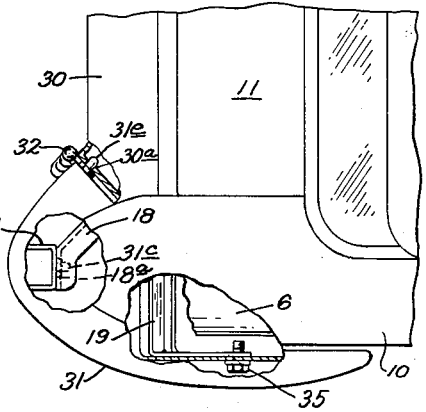
FIG. 8 is a plan view of the structure illustrated in FIG. 7, with parts cut away.
Figure 7:
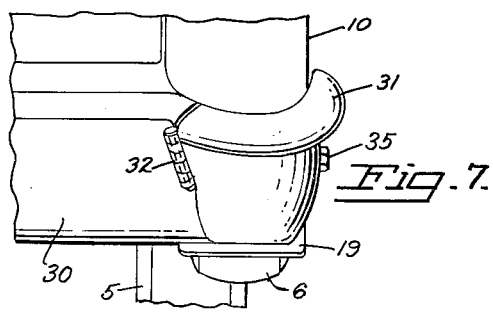
FIG. 7 is a view of the structure illustrated in FIG. 6 with the bumper section in closed position.

When the spare tire is to be removed, the bolt 35 is unscrewed by using the wheel wrench, the socket of which fits the head of the bolt. The section 31 of the bumper back is swung outwardly to the position as shown in FIGS. 1, 2, and 6. If a hub cap 7a is attached to the spare wheel, as illustrated in FIG. 5, this is removed to obtain access to the spare wheel mounting bolts 24. After the bolts 24 are removed the spare wheel and tire are then removed from the cutout 10a by first being moved outwardly to have wheel flange 7c clear the bracket flange 22c. The spare 6 is thereafter moved rearwardly slightly to clear the front edge 10a of the fender cut out and the front edge is moved outwardly to the postion shown in dash line in FIG. 2.

On replacing a deflated or inflated spare wheel and tire on the support the process is reversed. When bolt 35 is inserted and tightened to secure bumper section 31 across a portion of spare 6, studs 31c and 31e engage holes 18a and 30a respectively to increase the shock resistance of bumper section 31.

A cover could be used over the spare tire cut out as shown in my issued Patent No. 2,823,068 if desired for appearance's sake. The cover could be secured to the bumper section 31 which comes close to the center of the spare. If such a cover were used it would swing out of the way with the bumper section 31 when swung to the position shown in FIGS. 1 and 2.

A tail gate 11 and tail light housing 12 may be employed. However, this invention can be applied to any type of vehicle with enough space behind the rear wheels for a spare tire.

The flexible partition 41 is secured to the fender cut out by strip 41a and suitable fastenings or adhesives and also to body bracket 41b by strip 41c or by other suitable fastenings. This flexible partition offers a rock, dirt and mud guard to protect the spare tire recess and utilizes the minimum space between the spare and the rear tire.

If the space near the cut out 10a and the spare is close enough only a strip of flexible material may be applied to the inner edge of the cut out 10a against which the tire of the spare will seal when the spare is mounted on its support.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A vehicle having a rear wheel and tire, a spare wheel and tire, a body, said body having a substantially vertical side wall portion forming a compartment for enclosing the rear wheel and tire and a portion rearwardly thereof for enclosing the spare wheel and tire, the rear portion having an opening therein of a width less than the diameter of the spare wheel and tire requiring the wheel and tire to be angularly disposed relative to the longitudinal dimension of the body when being removed from or mounted within said rearward portion, a rear bumper having at least one forwardly projecting end portion hinged thereto and pivotable to and from said opening, a bracket fixedly secured to said body and extending around at least a portion of said spare wheel, and means for securing said pivoting end portion to said bracket in position across said opening.

2. A vehicle having a rear wheel and tire, a spare wheel and tire, a body, said body having a substantially vertical side wall portion forming a compartment for enclosing the rear wheel and tire and a portion rearwardly thereof for enclosing the spare wheel and tire, the rear portion having an opening therein of a width less than the diameter of the spare wheel and tire requiring the wheel and tire to be angularly disposed relative to the longitudinal dimension of the body when being removed from or mounted within said rearward portion, a rear bumper having at least one forwardly projecting end portion thereof movable to and from said opening, means for securing said end portion in fixed position across said opening, and a brace looped around the tire of the spare wheel having a portion to which said bumper and portion is secured.

3. A vehicle having a rear wheel, a spare wheel, a body, said body having a substantially vertical side wall portion rearwardly of said rear wheel, a cut out in said portion, said cut out having a radius less than the radius of said rear wheel from its center of rotation to the edge of its road contacting surface, mounting means for said spare wheel substantially central of said cut out, and a readily flexible wall secured to the vertical side wall portion adjacent to said cut out extending inwardly and secured to said body, said flexible wall engaging and conforming to the curvature of the tire of the spare wheel in response to the mounting of said spare wheel on said mounting means.

4. A vehicle having a rear wheel, a spare wheel, a body, said body having a substantially vertical side wall portion rearwardly of said rear wheel, a cut out in said portion, said cut out having a radius less than the radius of said rear wheel and tire, a mounting for said spare wheel and tire centrally of said cut out, a rear bumper, a movable portion on said rear bumper hingedly secured thereto, said movable portion extending across said cut out, a bracket fixedly secured to said body and extending around at least a portion of said spare wheel, and means for securing said movable portion to said bracket.

5. A vehicle having a rear wheel, a spare wheel, a body, said body having a substantially vertical side wall portion rearwardly of said rear wheel, a cut out in said portion, said cut out having a radius less than the radius of said rear wheel and tire, a mounting for said spare wheel and tire centrally of said cut out, a rear bumper, a movable portion on said rear bumper, a bracket fixedly secured to said body and extending around at least a portion of said spare wheel, and means for securing said movable portion to said bracket.

6. A vehicle having a rear wheel, a spare wheel and tire, a body, said body having a substantially vertical side wall portion rearwardly of said rear wheel containing a section cut out to expose a spare wheel and tire enclosed by said side wall portion, a rear bumper extending across the rear of the vehicle, a movable end section extending forwardly at one side of the body to a position across at least a portion of the cut out section, said end section being movable from the position across the cut out portion to a position for permitting the removal of the spare wheel and tire, a bracket fixedly secured to said body and extending around at least a portion of said spare wheel, and means for securing said movable end section to said bracket.

7. A vehicle having a rear wheel and tire, a spare wheel and tire, a body, said body having a substantially vertical side wall portion forming a compartment for enclosing the rear wheel and tire and a portion rearwardly thereof for enclosing the spare wheel and tire, the rear portion having an opening therein of a width less than the diameter of the spare wheel and tire requiring the wheel and tire to be angularly disposed relative to the longitudinal dimension of the body when being removed from or mounted within said rearward portion, a rear bumper, at least one forwardly projecting end portion extending from said rear bumper, said end portion being movable to and from said opening, means for securing said end portion in fixed position across said opening, said last mentioned means including first and second brackets fixedly secured to said body, said first bracket extending around at least a portion of said spare wheel, and means for securing said forwardly projecting end portion to said first bracket, said second bracket projecting rearwardly of said spare wheel and supportingly engaging said end portion.

References Cited in the file of this patent

UNITED STATES PATENTS

| | | |
|---|---|---|
| 1,780,974 | Hostutler | Nov. 11, 1930 |
| 2,186,505 | Tibbetts | Jan. 9, 1940 |
| 2,562,620 | Krueger | July 31, 1951 |
| 2,823,068 | Walker | Feb. 11, 1958 |
| 2,827,327 | Lindsay | Mar. 18, 1958 |
| 2,841,439 | Schwenk | July 1, 1958 |
| 2,842,394 | MacPherson | July 8, 1958 |
| 2,888,296 | Huggins | May 26, 1959 |

FOREIGN PATENTS

| | | |
|---|---|---|
| 1,021,256 | Germany | Dec. 19, 1957 |

OTHER REFERENCES

Publication, "Plymouth Station Wagon," page 3204, received Nov. 2, 1957.